(No Model.) 3 Sheets—Sheet 1.
J. GIELOW.
MACHINE FOR COUNTERBORING AND TAPPING NUTS.
No. 376,408. Patented Jan. 10, 1888.
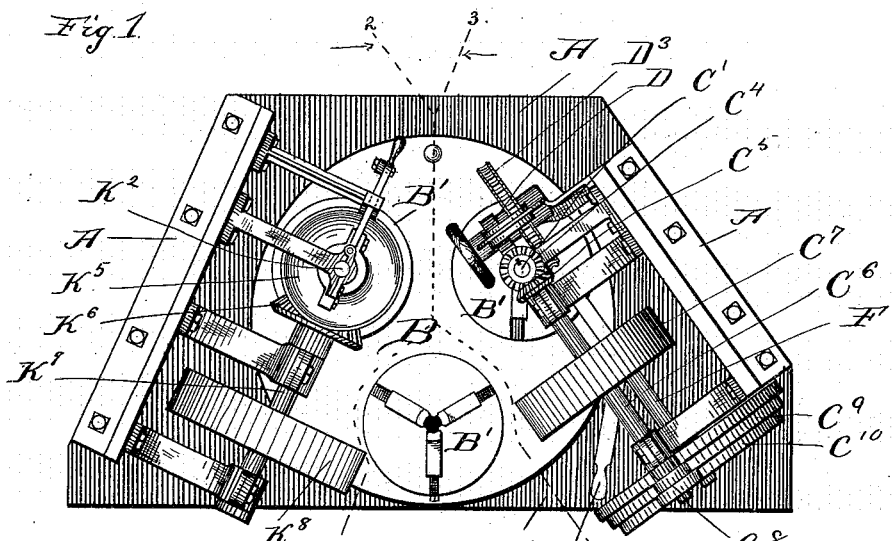
Fig. 1
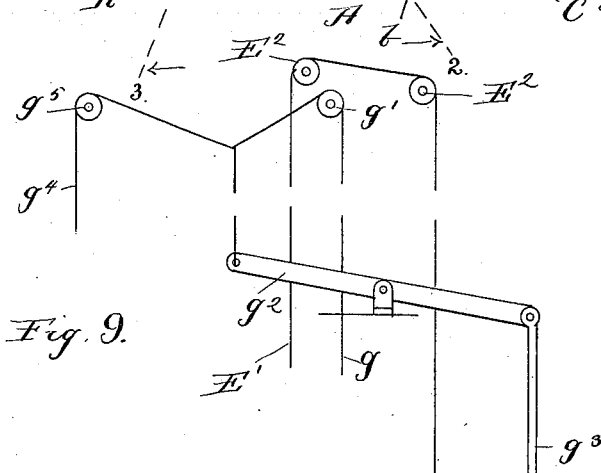
Fig. 9.
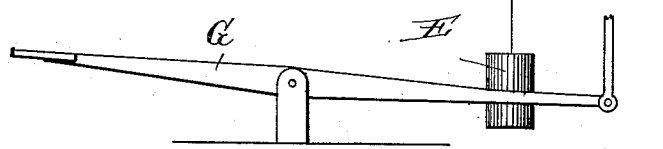
Witnesses:
Lew. E. Curtis.
H. W. Munday.
Inventor:
John Gielow
By Munday, Evarts and Adcock
His Attorneys.
N. PETERS, Photo-Lithographer, Washington, D. C.

(No Model.) 3 Sheets—Sheet 2.
J. GIELOW.
MACHINE FOR COUNTERBORING AND TAPPING NUTS.
No. 376,408. Patented Jan. 10, 1888.
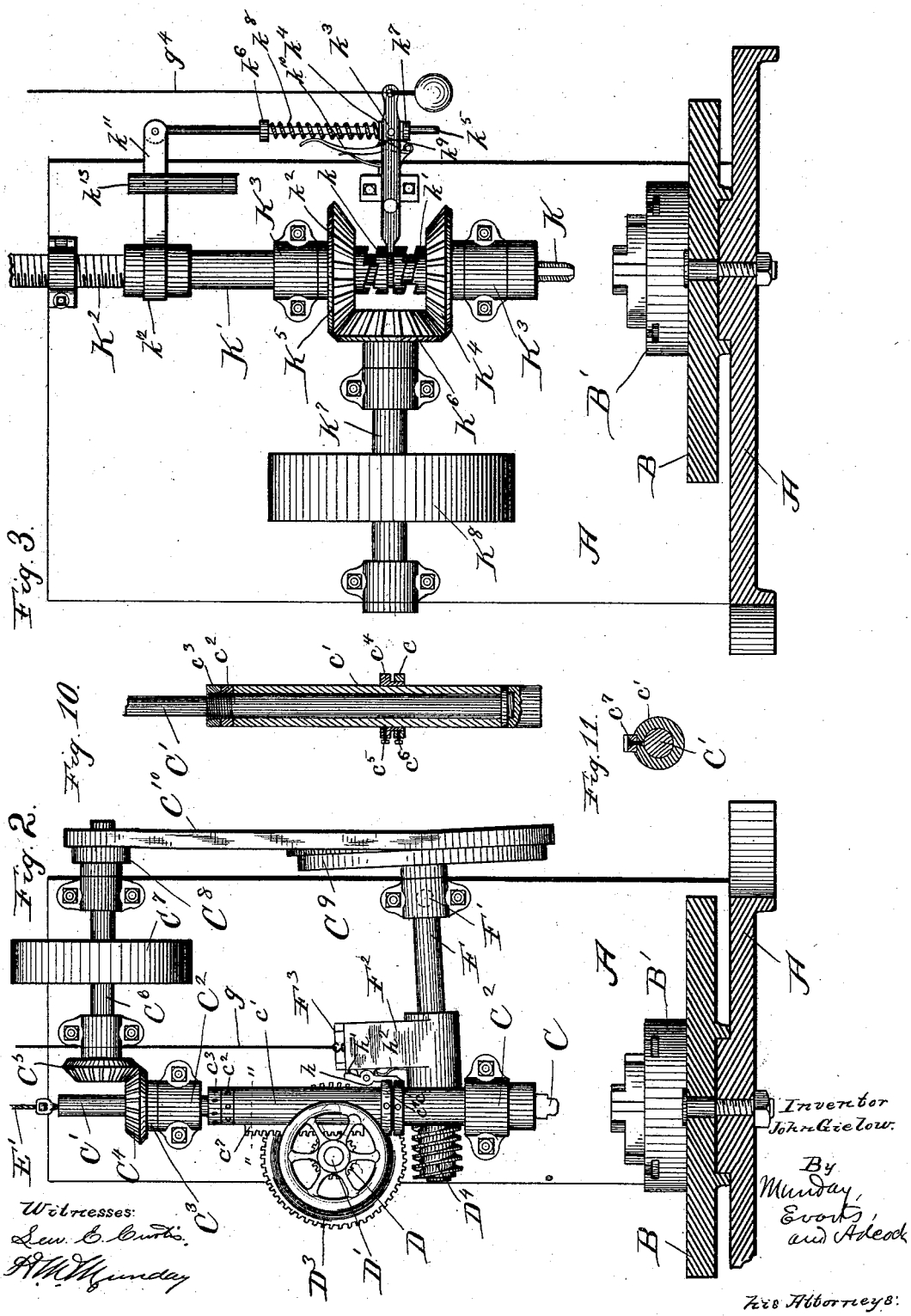

(No Model.) 3 Sheets—Sheet 3.
J. GIELOW.
MACHINE FOR COUNTERBORING AND TAPPING NUTS.
No. 376,408. Patented Jan. 10, 1888.
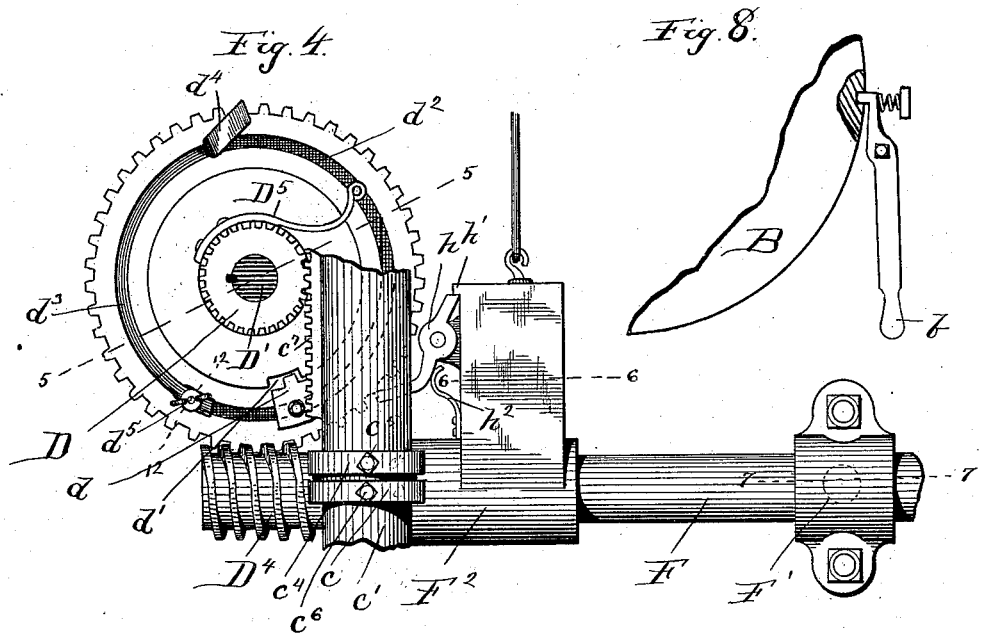
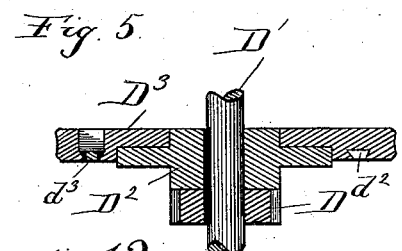
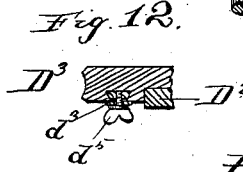
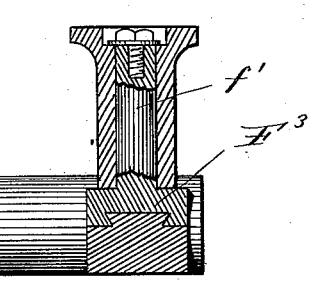
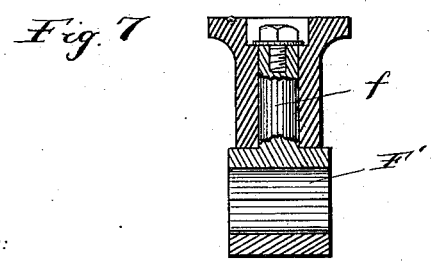
Witnesses:
Geo. E. Curtis
H. M. Munday
Inventor:
John Gielow
By Munday, Evarts and Adcock
his Attorneys

UNITED STATES PATENT OFFICE.

JOHN GIELOW, OF CHICAGO, ILLINOIS.

MACHINE FOR COUNTERBORING AND TAPPING NUTS.

SPECIFICATION forming part of Letters Patent No. 376,408, dated January 10, 1888.

Application filed July 5, 1887. Serial No. 243,366. (No model.)

*To all whom it may concern:*

Be it known that I, JOHN GIELOW, a citizen of the United States, residing in Chicago, in the county of Cook and State of Illinois, have invented a new and useful Improvement in Machines for Tapping and Counterboring, of which the following is a specification.

My invention relates to machines for tapping and counterboring, or boring and facing nuts and other articles.

In order to leave the end or face of the nut or other article smooth, it is essential that the counterboring or facing tool should make one or more revolutions after it ceases to feed forward and before it begins to recede, or that it make several revolutions while feeding very slowly or slightly at the completion of the nut, otherwise the face of the nut will be left rough or notched to the extent of the thickness of the chip being cut by the facing-tool at the time it was withdrawn. Where the counterboring or facing is done by hand, the operator accomplishes the desired result by gradually diminishing the pressure he exerts upon the boring-tool as the operation nears completion.

It is the object of my invention to provide an automatic machine of a simple and efficient construction for counterboring or facing nuts and like articles and simultaneously tapping the same.

My invention consists, in connection with a suitable chuck or clamp for holding the nut or article while being operated upon, of a revolving counterboring or boring and facing tool and mechanism for automatically feeding the same forward as it revolves, the boring-tool or its shaft being provided with a collar or stop to limit its forward movement or the extent of its feed, and the feed mechanism being furnished with a spring or yielding device to permit the feed movement to continue for a short period after the stop is reached, and thus press or hold the revolving tool against its work for a few revolutions after its forward feed is arrested by the feed-stop.

It further consists, in connection with such automatic boring and facing tool or device, of a revoluble table or frame furnished with a series of clutches or clamps and a tapping-tool operating simultaneously to tap or thread one nut while the counterboring-tool is preparing another nut for the threading operation.

It further consists in the peculiar feed and stop mechanism I employ for operating the counterboring-tool.

It also consists in the novel devices and novel combination of parts or devices herein shown and described, and more particularly pointed out in the claims.

In the accompanying drawings, which form a part of this specification, and in which similar letters of reference indicate like parts, Figure 1 is a plan view of a machine embodying my invention. Fig. 2 is a sectional view on line 2 2 of Fig. 1, showing in elevation the counterboring mechanism. Fig. 3 is a similar view, looking from line 3 3, of Fig. 1, and showing the tapping or threading device. Fig. 4 is an enlarged detail view of the feed mechanism for the counterboring-tool. Fig. 5 is a section on line 5 5 of Fig. 4. Fig. 6 is a section on line 6 6 of Fig. 4. Fig. 7 is a section on line 7 7 of Fig. 4. Fig. 8 is a detail view showing the clutch or stop for holding the chuck-table in place and registering the nut-holder chucks or clamps with the tools; and Fig. 9 is a diagram or view illustrating the operating lever or treadle and its connections. Fig. 10 is a longitudinal section of the sleeve and adjustable stop-collar on the boring-tool spindle. Fig. 11 is a cross-section on line 11 of Fig. 10, and Fig. 12 is a section on line 12 12 of Fig. 4.

In said drawings, A represents the frame of the machine; B, a revolving table or frame carrying the chucks or clamps B′ B′ B′ for holding the nuts or articles to be counterbored and tapped. The chucks B′ are of an ordinary and well-known construction. The rotatable table or frame B is registered and held in place by a clutch-lever, $b$, that engages suitable recesses in the periphery of the table.

C is the counterboring-tool, having the usual shoulder for smoothing the end or face of the nut.

C′ is the reciprocating spindle on which the tool is mounted; $C^2$, the bearings or guides in which it reciprocates, and $C^3$ the hollow shaft to which it is suitably splined and by which it is revolved. The hollow shaft $C^3$ is driven by a bevel-gear, $C^4$, thereon, which meshes with a bevel-gear, $C^5$, on the driving-shaft $C^6$.

$C^7$ is the driving-pulley. The spindle $C'$ is furnished with a stop, $c$, consisting, preferably, of a collar or other suitable projection carried by the spindle, to limit the forward or downward feed of the counterboring-tool. This stop or collar $c$ is, or should be, made adjustable on the spindle. It is preferably secured to the non-rotary sleeve $c'$, which is fixed longitudinally on the spindle $C'$ by the threaded rings or jam-nuts $c^2$ $c^3$. The stop collar or rim $c$ is furnished with screw-threads, and turns upon the threaded shoulder of the adjustable collar $c^4$. The collar $c^4$ is adjustably secured to the sleeve $c'$ by the set-screw $c^5$, and the stop-ring $c$ is further provided with a set-screw, $c^6$. The stop $c$ strikes against the lower box or bearing, $C^2$, which is fixed to the frame of the machine, and thus arrests the forward or downward feed of the boring-tool. The sleeve $c'$ is provided with a rack, $c^7$, for feeding the spindle $C'$ down.

A gear, D, on the feed-shaft $D'$ meshes with the feed-rack $c^7$. The gear D is keyed to the shaft $D'$, and the shaft $D'$ is also furnished with a hub, $D^2$, also keyed rigidly thereto, upon which hub is mounted a loose gear-wheel, $D^3$, the teeth of which mesh with a worm, $D^4$. The loose gear $D^3$ is connected to the gear D, or, rather, to the fixed hub $D^2$, by means of a spring, $D^5$, so that the feed-wheel D may be arrested while the gear $D^3$ continues slightly to revolve. A pin or projection, $d$, on the wheel $D^3$, fitting in a slot or recess, $d'$, in the hub $D^2$, limits the extent of this yielding or spring movement of the gear $D^3$ after the motion of the feed-wheel D is arrested. The shaft F of the worm $D^4$ is journaled in movable bearings $F'$ $F^2$, the bearing $F'$ being pivoted at $f$ to the frame, and the bearing $F^2$ reciprocating up and down in a dovetail frame or slideway, $F^3$, which is likewise pivotally connected to the frame of the machine at $f'$. The sliding bearing $F^2$ is operated by means of a lever or treadle, G, and suitable connecting cords, pulleys, and levers, as $g$ $g'$ $g^2$ $g^3$, to move the worm in contact with the gear $D^3$, and thus feed the boring-tool down against the nut. The wheel $D^3$ is furnished with an annular groove, $d^2$, in which fits an adjustable segment, $d^3$, having a curved end or projection, $d^4$, by which the pawl $h$ is operated to release the slide $F^2$, and thus disengage the worm $D^4$ from the gear $D^3$. When the worm is moved into contact with the gear, as shown in Fig. 4, the pawl $h$ engages a notch or projection, $h'$, on the sliding bearing $F^2$, and thus holds the worm in engagement with the wheel until the wheel revolves far enough to cause the tripper device or projection $d^4$ to strike the pawl $h$ and disengage it from the slide $F^2$, when said slide will drop, and thus disengage the worm $D^4$ from the gear $D^3$. The pawl $h$ is provided with a spring, $h^2$, to hold it in place. The segment $d^3$ is adjustably secured in the wheel $D^3$ by a clamp-screw, $d^5$.

By adjusting the position of the pawl-tripping device $d^4$ on the wheel $D^3$ the tool C may be fed down a greater or less extent before the pawl is disengaged from the slide $F^2$. The pin or projection $d$ is also adjustably secured in the groove $d^2$ of the wheel $D^3$, so that the tension of the spring $D^5$ may be regulated, as required from time to time.

The shaft F is driven from the shaft $C^6$ by pulleys $C^8$ $C^9$ and belt $C^{10}$. A weight, E, connected to the spindle $C'$ by a line, $E'$, passing over a pulley, $E^2$, serves to retract the spindle the moment the worm $D^4$ is disengaged from the wheel $D^3$, so that the shaft $D'$ may revolve freely in the opposite direction as the rack $c^7$ moves upward or back.

The tapping-tool K is mounted upon a sliding shaft or spindle, $K'$, having the usual screw-threads, $K^2$, to feed it forward, and journaled in suitable bearings, $K^3$, in the frame A. The spindle $K'$ is revolved in opposite directions by the driving and reversing gears $K^4$ $K^5$, loosely journaled thereon, which mesh with a bevel-gear, $K^6$, on the shaft $K^7$.

$K^8$ is the driving-pulley.

The shaft $K'$ is furnished with a sliding double clutch, $k$, secured from rotation on said shaft by a spline or other suitable means, which alternately engages the clutch-faces $k'$ and $k^2$ of the driving and reversing gears $K^4$ $K^5$. The clutch $k$ is operated by a lever, $k^3$. The lever $k^3$ carries a pivotal block or bearing, $k^4$, through which passes a sliding rod, $k^5$, having fixed collars or shoulders $k^6$ $k^7$ and a coil-spring, $k^8$. The block $k^4$ has a notch or projection, $k^9$, which engages the pawl $k^{10}$. The rod $k^5$ is pivoted to an arm, $k^{11}$, carried on a loose collar, $k^{12}$, on the shaft $K'$. A guide, $k^{13}$, keeps the arm $k^{11}$ in place. The clutch-lever $k^3$ is operated to throw the clutch $k$ into engagement with the driving-gear $K^4$ by means of the operating-lever G and the line $g^4$ and pulley $g^5$, connected with said lever by the lever $g^2$ and link $g^3$. The tapping and counterboring tools are thus made to operate simultaneously. When the clutch $k$ is thus thrown into engagement with the driving-gear $K^4$, it is so held by the pawl $k^{10}$ engaging the block $k^4$ on the lever $k^3$, until the longitudinal movement of the spindle $K'$ causes the collar or projection $k^6$ on the rod $k^5$ to strike the end of the pawl $k^{10}$, and thus release the clutch-lever, when the spring $k^8$ will throw the clutch $k$ into engagement with the clutch-face of the reversing-gear $K^5$. As the feed-screw $K^2$ causes the spindle $K'$ to travel back, the collar $k^7$ will strike against the block $k^4$ and move the clutch $k$ out of engagement with the reversing-gear, after the tool K has been unthreaded from its work. This mechanism for automatically reversing the motion of the threading-tool and stopping the same forms part of another application filed by me of even date herewith, and is not herein claimed. In this machine I prefer to employ this mechanism for automatically operating the tapping or threading tool.

However, other suitable equivalent means or substitute mechanism may be employed for this purpose.

The spring $D^5$, or other suitable yielding device, is preferably located between the wheels D and $D^3$, as shown and described. It may, however, be used as the connection between other parts of the feed mechanism without departing from my invention. For example, the rack $c^7$ might have a spring or yielding connection with the sleeve $c'$. I wish it also to be distinctly understood that, while certain features of my invention consist in the particular kind or form of feed mechanism I have devised, my invention, in its broader features, is not confined thereto, but other suitable equivalent or substitute devices may be used.

In operation, while a nut or article is being placed by the operator in one of the three chucks B' on the table B the counterboring-tool C is boring and facing the nut in the second chuck, and the tapping-tool threading the nut in the third chuck.

I claim—

1. The combination, with a rotatable table or frame having chucks or clamps mounted thereon, of a revolving counterboring-tool, a stop to limit its forward feed, and automatic mechanism for feeding the same provided with a spring or yielding device connecting the same with the tool and adapted to keep the tool pressed against its work after its forward motion has been arrested by said stop, and thus to permit such counterboring-tool to make one or more revolutions in contact with its work after its forward feed has been arrested, a tapping-tool, and mechanism for operating said tapping-tool simultaneously with said counterboring-tool, substantially as specified.

2. The combination, with a suitable chuck or work-holder, of a counterboring tool furnished with a stop to limit its forward feed, and automatic means for feeding said counterboring-tool provided with a spring or yielding device through which the feed motion is communicated to said tool to permit such tool to revolve in contact with its work after its forward feed has been arrested, substantially as specified.

3. The combination, with a chuck or work-holder, of a counterboring-tool mounted on a revolving spindle furnished with an adjustable stop or collar, a feed-rack and feed-wheel, a wheel for driving such feed-wheel, and a spring connection between the two, substantially as specified.

4. The combination, with a chuck or work-holder, of a revolving tool-carrying spindle or shaft, a stop to limit its forward feed, a feed-rack, feed wheel and shaft, and driving-wheel loosely journaled on said feed-shaft, a spring connecting said driving-wheel and feed-wheel, and a worm or gear for operating said driving-wheel, substantially as specified.

5. The combination, with a chuck or work-holder, of a revolving tool-carrying spindle or shaft, a stop to limit its forward feed, a feed-rack, feed wheel and shaft, and driving-wheel loosely journaled on said feed-shaft, a spring connecting said driving-wheel and feed-wheel, and a movable worm journaled at one end in a pivotal bearing and at the other in a sliding bearing mounted on a pivotal guide, substantially as specified.

6. The combination, with a chuck or work-holder, of a revolving tool-carrying spindle or shaft, a stop to limit its forward feed, a feed-rack, feed wheel and shaft, and a driving-wheel loosely journaled on said feed-shaft, a spring connecting said driving-wheel and feed-wheel, a movable worm journaled at one end in a pivotal bearing and at the other in a sliding bearing mounted on a pivotal guide, and a pawl engaging said sliding bearing for holding said worm in contact with said driving-wheel, substantially as specified.

7. The combination, with a chuck or work-holder, of a revolving tool-carrying spindle or shaft, a stop to limit its forward feed, a feed-rack, feed wheel and shaft, and a driving-wheel loosely journaled on said feed-shaft, a spring connecting said driving-wheel and feed-wheel, a movable worm journaled at one end in a pivotal bearing and at the other in a sliding bearing mounted on a pivotal guide, and a pawl engaging said sliding bearing for holding said worm in contact with said driving-wheel, and a projection or arm on said driving-wheel for tripping said pawl, substantially as specified.

8. The combination, with rotatable table B, having chucks B' B' B', of a tapping or threading tool, K, mounted on a revolving spindle, K', mechanism, substantially as described, for driving, reversing, and stopping said spindle, a counterboring-tool, as C, carried on a revolving spindle, C', a stop to limit its forward feed, and feed mechanism furnished with a spring or yielding device, through which the feed motion is communicated to said tool, to permit said counterboring-tool to revolve in contact with its work after its forward feed is arrested by said stop, an operating-lever, as G, and suitable connecting mechanism for putting both said tools in operation simultaneously, substantially as specified.

9. The combination, with a revolving reciprocating tool-carrying spindle, of a feed rack and wheel, and a movable worm for operating said feed-wheel, having a pivotal bearing, $F'$, at one end and a sliding bearing, $F^2$, at the other, mounted on a pivotal guide, $F^3$, substantially as specified.

10. The combination, with a revolving reciprocating tool-carrying spindle, of a feed rack and wheel, and a movable worm for operating said feed-wheel, having a pivotal bearing, $F'$, at one end and a sliding bearing, $F^2$, at the other, mounted on a pivotal guide, $F^3$, a pawl, $h$, and pawl-tripping device $d^4$, substantially as specified.

11. The combination, with a chuck or work-holder, of a revolving reciprocating tool-carrying spindle, as C', having a stop, as c, and a feed-rack, as c⁷, a feed-wheel, D, feed-wheel shaft D', loose driving-wheel, as D², a spring, as D⁵, and a pin or projection, as d, on said wheel D², to limit its movement in respect to said feed-wheel D, substantially as specified.

12. The combination, with a revolving reciprocating tool-carrying spindle, as C', with a feed-wheel and feed-rack, a feed-wheel shaft, as D', a gear thereon, as D³, furnished with an annular channel, d², segmental ring d³, having projection d⁴, and a pawl, h, substantially as specified.

JOHN GIELOW.

Witnesses:
WILLIAM B. CLIFFORD,
H. W. MUNDAY.